Patented Mar. 21, 1939

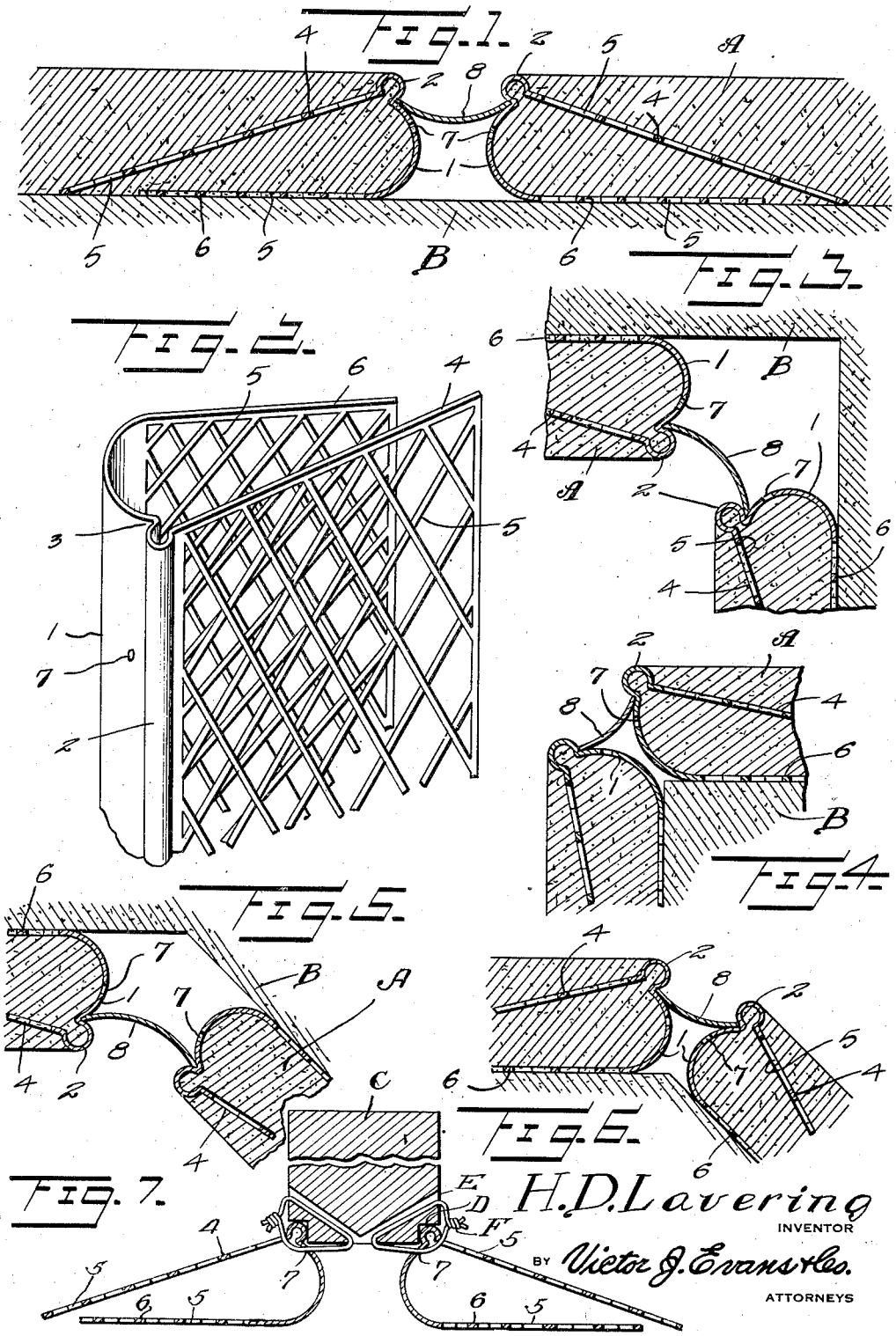

2,151,605

UNITED STATES PATENT OFFICE 2,151,605

EXPANSION JOINT FOR PLASTIC WALL SECTIONS

Harry D. Lavering, Venice, Calif.

Application April 11, 1938, Serial No. 201,387

6 Claims. (Cl. 72—107)

This invention relates to metallic expansion joints primarily designed for plastered, stuccoed, or other like coated or surfaced walls, ceilings, etc. and its general object is to provide a joint that will prevent the coating from cracking regardless of the movement thereof, brought about by expansion, contraction or settling, in that the joint will give freely in the direction of the movement.

Another object is to provide an expansion joint that can be easily and expeditiously applied and to a corner of any angle, and not only locks the adjacent ends of the plastic coating together, in spaced relation to each other to allow for relative movement thereof for the purpose set forth, but the joint is neat in appearance, simple in construction, inexpensive to manufacture, and extremely efficient in use and service.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:

Figure 1 is a horizontal sectional view taken through a wall and illustrates my joint applied to the confronting ends of aligned plastic sections.

Figure 2 is a fragmentary perspective view of one of the joint members, per se.

Figures 3 to 6 inclusive are horizontal sectional views illustrating the joint applied to interior and exterior corners of various angles.

Figure 7 is a horizontal sectional view illustrating the joint members attached to a straight edge member for holding the joint members in proper position relative to each other while securing the same in use.

Referring to the drawing in detail, it will be noted that I have illustrated my joint as being used with aligned plastic sections of a wall, as shown in Figure 1, and also at corners of various angles, but I want it understood that the joint can be used at any place desired for the purpose intended.

The joint includes a pair of companion members each being identical in construction, and formed from sheet metal to provide a transversely curved body portion 1 that extends longitudinally throughout the length of its member, as indicated in Figure 2 and the body portion 1 along one longitudinal edge thereof is rolled upon itself to provide a bead 2 which may or may not be co-extensive with the length of the body portion, but in any event the bead provides a channel 3 at its juncture with the body portion, for a purpose which will be later described.

Formed on the outer edge of the bead and extending at an inward angle with respect to the body portion is a flange or wing 4 in the form of an open work frame of metallic lath configuration, in that it includes diagonally arranged cross strips 5 in the form as shown, while formed on the longitudinal edge of the body portion opposed to the bead is a like flange or wing 6 which may be termed the inner or base wing, but the inner wing is not inclined and extends in a straight plane from its edge of the body portion.

The inner or base wing 6 is of less width than that of the outer or inclined wing 4, and the wing 4 terminates at its outer end in the same plane with the outer end of the wing 6. The interstices of the wings 4 and 6 provide interlocking means for the plastic material as will be apparent, and the interstices of the wing 4 are larger than those of the wing 6, in that the wing 4 extends diagonally through the plastic sections which are indicated by the reference numeral A, while the wing 6 is disposed in abutting relation with respect to the foundation B of the wall.

In applying the joints in position for use, I preferably provide a straight edge member C having opposed corners thereof recessed as at D and provided with bores E diverging centrally from the working face thereof, as shown in Figure 7. The joint members are temporarily secured to the straight edge member by wires F extending through the bores and openings 7, the latter being disposed in the body portions of said joint members. The recesses D act as seats for receiving the beads 2, so that the joint members will be held straight and in true parallelism with each other while being applied in use. After the joint members are attached to the straight edge member they are connected to the foundation B by suitable fastening means, thence the straight edge members C and wire 7 are removed and the joint is ready for the plastic material which when applied and become set, a concavo-convex bridging strip 8 of resilient material is seated in the channels 3, and is arranged therein with the concaved face outermost, as shown, consequently it will be obvious that regardless of the movement of the plastic sections, the resilient strip will give and thereby prevent cracking of the sections.

While it has been stated that the bridging strips 8 are of concavo-convex formation, they may be flat, but in any event they are formed from resilient or spring metal and compressed in place to be seated in the channels 3.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:

1. An expansion joint for plastic wall sections comprising companion joint members including wings to be fixed in spaced end portions of adjacent wall sections for disposal of the members in spaced relation to each other, and resilient means for bridging said sections and detachably connected thereto.

2. An expansion joint for plastic wall sections comprising companion joint members having channels therein providing seats extending longitudinally thereof, wings included in said members to be fixed in spaced end portions of adjacent wall sections for disposal of the members in spaced relation to each other, and resilient means for bridging said members and mounted in the seats thereof.

3. An expansion joint for plastic wall sections comprising companion joint members having channels therein providing seats extending longitudinally thereof, said members including wings to be fixed in spaced end portions of adjacent wall sections for disposal of the members in spaced relation to each other and concavo-convex strips of resilient material bridging said members and mounted in the seats thereof.

4. An expansion joint for plastic wall sections comprising companion joint members, each including a body portion, wings formed on and extending from the longitudinal edges of the body portion to be fixed in spaced end portions of adjacent wall sections for disposing the body portions in spaced relation to each other, beads formed on one of the longitudinal edges of the body portions to provide channels forming seats at the juncture of the beads with the body portions, and a strip of resilient metal bridging the body portions and mounted in the seats thereof.

5. An expansion joint for plastic wall sections comprising companion joint members, each including a body portion curved transversely and extending longitudinally throughout the length thereof, beads formed on one of the longitudinal edges of the body portions to provide channels forming seats at the juncture of the beads with the body portions, a wing formed on each bead and extending inwardly therefrom at an inclination, a wing formed on the opposite longitudinal edge of each body portion and together with the first wings to be fixed in spaced end portions of adjacent wall sections for disposal of the members in spaced relation to each other, and a concavo-convex strip of resilient metal for bridging said bodies and mounted in the seats with the concaved faces thereof disposed outermost.

6. An expansion joint for plastic wall sections comprising companion members each including a transversely curved body portion, rounded beads formed on one of the longitudinal edges of the body portions to provide channels at the juncture of the beads with the body portions to form seats, outer wings formed on the outer longitudinal edges of the beads and extending inwardly therefrom at an inclination, inner wings formed on the other longitudinal edges of the body portions and being of less width than the outer wings, said outer wings to be embedded in spaced end portions of adjacent wall sections and the inner wings cooperating with the outer wings for fixing the members in spaced relation to each other, said wings being of open work frame lath formation, and a concavo-convex strip of resilient metal bridging the body portions and mounted in the seats with the concaved faces thereof outermost.

HARRY D. LAVERING.